UNITED STATES PATENT OFFICE 2,043,148

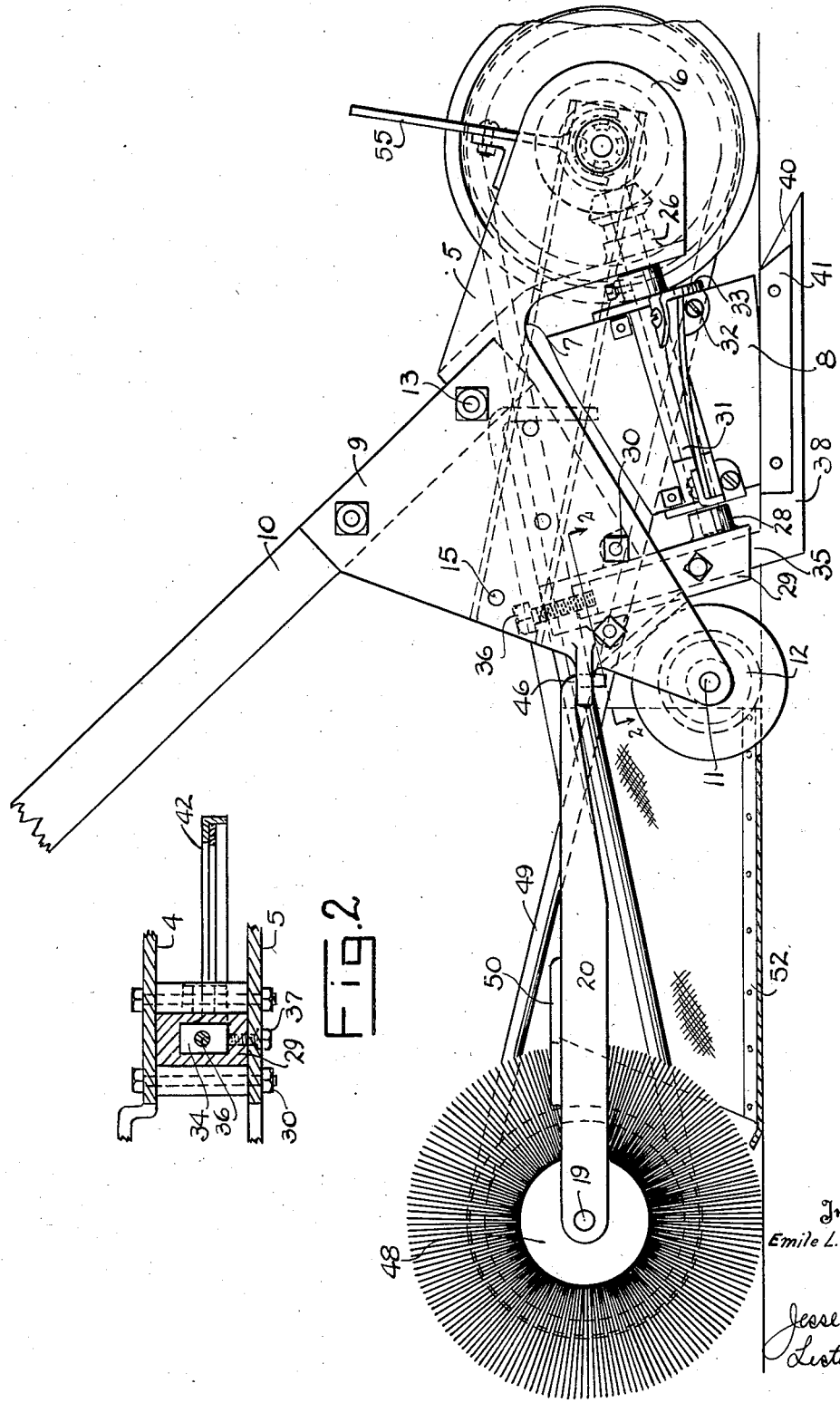

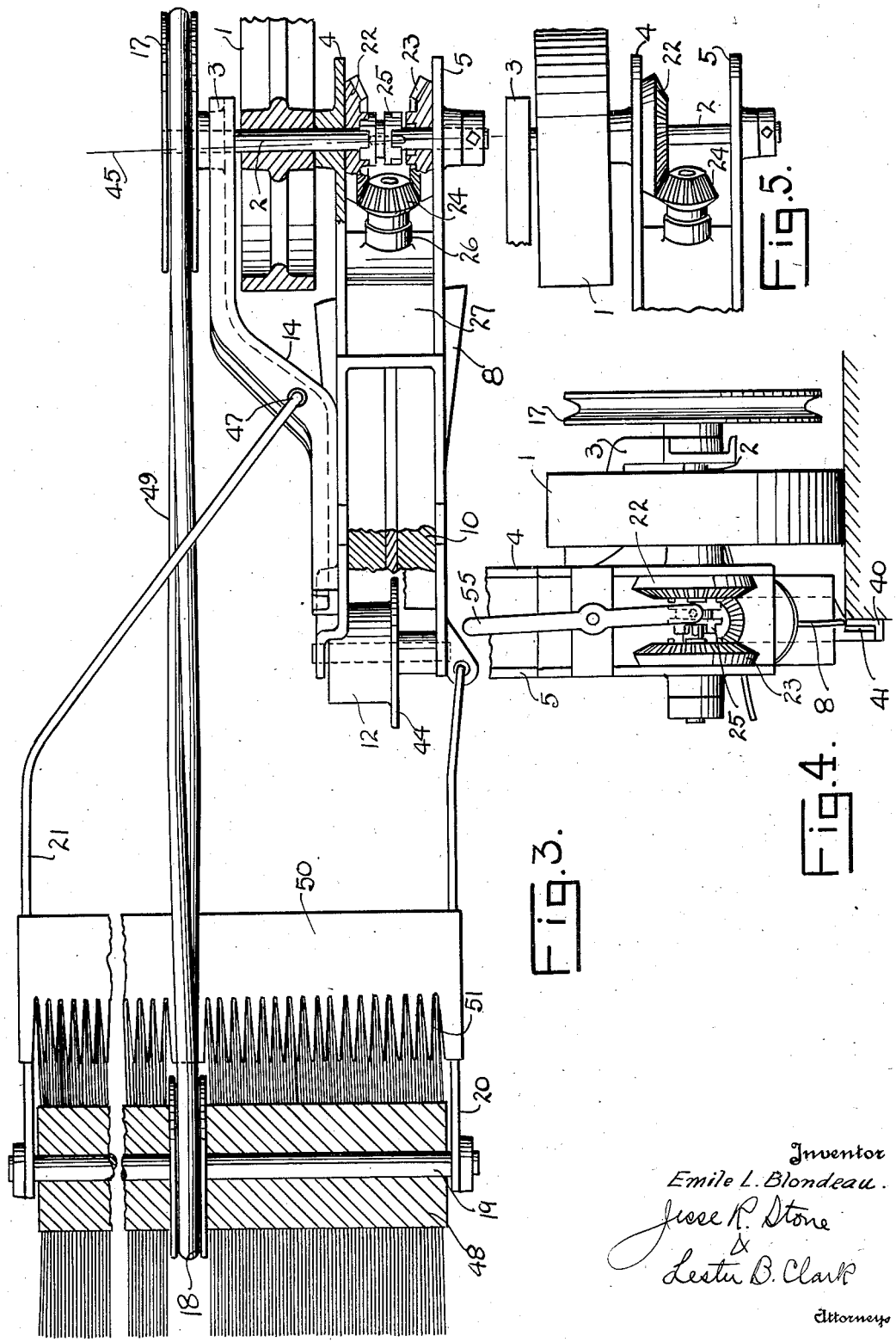

LAWN EDGER

Emile L. Blondeau, Houston, Tex.

Application June 14, 1932, Serial No. 617,111

9 Claims. (Cl. 56—249)

My invention relates to a device for trimming the edges of lawns.

It is an object of the invention to provide a mechanical device for trimming the edges of the lawn along the walks or flower beds and the like whereby a smooth and even edge may be provided with a minimum of work and effort connected therewith.

I desire to provide an edging device constructed to operate on the general principle of a lawn mower, but which is particularly adapted for working along the edges of walks and which is capable of being readily guided in a direct line by engagement of a guide means thereon with the walk or curb.

I also desire to provide an edger which is capable of being reversed in direction so that it may be particularly adapted for use along the edges of flower beds and enable the operator to direct the device along the sod marking the edges of the beds.

I also desire to provide means for engaging and removing the cuttings following the cutting operation.

In the drawings herewith, Fig. 1 is a side elevation of my improved device, the handle being broken away.

Fig. 2 is an enlarged detail in section on the plane 2—2 of Fig. 1.

Fig. 3 is a top plan view of the structure shown in Fig. 1 partly in section along the operating mechanism and with the carrier for the grass removed.

Fig. 4 is a front elevation of my device.

Fig. 5 is a broken detail illustrating a slight change in the operating gears employed with my apparatus.

My device employs a frame-work adapted to be supported upon a traction wheel 1 mounted rigidly upon a shaft 2 supported at its ends in the frame members 3, 4, and 5. The members 4 and 5 are the main portions of the frame and are preferably made of plates the general shape of which will be best understood from Fig. 1. Both plates are substantially the same shape having their forward ends 6 rounded and the lower sides of the plates being recessed upwardly as shown at 7 to accommodate a rotatable cutter 8. The rearward ends of the plates are formed to provide attachments at 9 for a handle 10 fitting between the two plates. Below the handle the rearward end of each plate is extended downwardly to support an axle 11 of a guide wheel 12. The handle 10 is connected to the plate at 9 by fitting between the two plates and secured rigidly in position by a plurality of through-bolts 13.

The supporting member 3 is in the nature of a brace. It has its forward arm provided with a bearing to support the shaft 2 and is extended rearwardly from the shaft and then curved laterally at 14, and then extended along the side of the plate 4 to which it is attached by rivets 15 or any similar means. This supporting member, therefore, tends to form a reinforcement for the support frame work as will be obvious from Fig. 3.

The shaft 2 is the drive shaft. One end is extended beyond the support 3 and may be provided with a pulley 17 for the purpose of driving the pulley 18 mounted upon a shaft 19 in a frame 20 and 21 to the rear of the edger as will be later noted.

The other end of the shaft between the two supporting plates 4 and 5 is formed with gears 22 and 23 thereon, said gears being beveled gears facing each other and adapted to simultaneously mesh with the pinion 24. Neither of these gears is keyed to the shaft. Between them, however, is a compound clutch 25 with teeth facing toward both of the gears and adapted to be moved longitudinally of the shaft into engagement with either, but not both, of the gears 22 and 23. This clutch member is keyed to the shaft and rotates constantly with the shaft and will bring either of the gears into engagement with the shaft in an obvious manner when the clutch is shifted.

The pinion 24 is driven from the drive shaft. It is mounted upon a driven shaft which is extended downwardly in an inclined direction as will be seen in Fig. 1, and has a bearing at 26 in a plate 27 extending across between the two frame members 4 and 5. Its lower end is journaled for rotation in the bearing 28 formed upon the forward side of a hollow support or bushing 29 bolted between the two plates as shown at 30.

Mounted rigidly upon the driven shaft is a cutter made up of four or more blades 8 which are extended outwardly from the sleeve 31 secured to said shaft. Each of the blades is tapered somewhat in width from the forward to the rearward end and is set slightly spiral relative to the shaft as will be obvious from Fig. 1. The blades are removably secured to the sleeve 31 by means of the set screws 32 engaging said blades with laterally extending lugs 33 on the sleeve 31.

The bushing 29 previously referred to is rectangular and shown best in Fig. 2. Said shaft has a rectangular opening longitudinally thereof shown at 34 in Fig. 2, and is adapted to receive a post 35 which is adjustable longitudinally thereof by means of a set screw 36 at the upper end thereof and may be secured in adjusted position by a set screw 37 extending laterally through the said support. The lower end of the post 35 is joined with a guide member 38 which is a flat plate extended forwardly beneath the cutter sleeve 31 and has its forward end beveled downwardly at 40 to engage beneath the grass which is to be cut. A cutting blade 41 is secured to the guide member and cooperates with the blades 8 of the cutter to sever the grass along the edge of the walk. The supporting bushing 29 is reinforced by a longitudinally extending brace 42 shown in Fig. 2.

The guide roller 12 which is mounted at the rearward end of the frame acts as the support for the frame and also as a guide. I provide a radial flange 44 along the outer margin of the roller and in position directly behind the guide 38 so that the same may run along the edge of the walk. In order to hold this flange 44 in proper position against the walk, I may change the angle of the shaft 2 as shown by the line 45 in Fig. 3. By shifting the shaft at a slight angle to its full line position shown in the drawings, I tend to move the flange 12 and also the guide member 38 somewhat against the edge of the walk and assure that it will operate with the guide directly against the edge of the walk without special guidance.

I may employ a carrier and brushing device to go with my edger to pick up and carry with it the grass cut from the edge of the walk. I have previously noted the two frame members 20 and 21 which support the shaft 19. The frame member 20 comprises a plate extending forwardly and having its front end hooked at 46 to engage through an eyelet in the frame member 21. Its rearward end is pivoted to the shaft 9 and communicates a pull upon the shaft. The supporting member 21 is a similar plate which has its forward end bent laterally and secured at 47 to the frame member 3.

The shaft 19 supported in this frame has thereon a brush roller 48 and the pulley 18 previously referred to. A flexible belt or line 49 connects the pulley 17 with the pulley 18 and tends to rotate the brush roller to brush up the sweepings from behind the edger. I have shown a guard 50 mounted between the two frame members 20 and 21 and having a toothed edge 51 extended over the forward edges of the brush roller and thus when the brush is rotated upwardly on its forward side the toothed rearward edge of the guide will tend to clear the cuttings from the brush and assure that they fall upon a pan 52 of ordinary construction mounted forwardly of the roller.

By the use of the two gears 22 and 23 it will be obvious that the cutter shaft may be rotated in either direction. The clutch 25 is adapted to be operated to engage the drive shaft with either of the gars 22 or 23 to operate the cutter for rotation in either direction by means of a clutch lever 54 shown best in Fig. 4. Thus when the edger is used along the margin of the walk, the cutter will be rotated in a direction to throw the cuttings inwardly, but when the device is used along the edge of a flower bed it is sometimes advisable to operate the device in the reverse direction so that the traction wheel 1 may rest upon the sod rather than upon the bed itself. This can be most conveniently done by reversing the direction of the mower and reversing the direction of rotation of the cutter.

While this reversal in direction is sometimes advisable it is not absolutely necessary, and in Fig. 5 I have shown but a single gear 22 upon the shaft, the cluth and the gear 23 being eliminated. I wish it to be understood that my device is adapted for use with or without the reversing feature.

During the operation of the device, the wheel 1 at the forward end of the edger will be supported upon the walk and the guide member 38 will be positioned along the edge of the walk with the flange 44 upon the guide wheel 12 also hugging the edge of the walk. As the device is pushed along the walk the cutter 8 will be rotated to trim the grass which is moved into the path of the cutter by the forward guiding end 40 of the guide. The grass thus trimmed from the edge of the lawn will be thrown in the path of the brush 48 and will be swept into the pan 52 by which it will be carried.

The operation of this device is a simple one and due to its simplicity of construction, the device will not easily get out of order and will operate to trim the lawn quickly and accurately thus acting to economize both in time and expense.

Having described my invention, what I claim is:

1. A lawn edger including a traction wheel, a drive shaft rotated thereby, a frame supported on said shaft and perpendicular thereto, a rearwardly and downwardly extending driven shaft operatively connected with said drive shaft, a rotating cutter fixed to said driven shaft and tapered rearwardly from said drive shaft, a stationary blade cooperating with said rotating cutter, and means to propel said wheel and frame.

2. A lawn edger including a traction wheel, a drive shaft rotated thereby, a frame on said shaft, a driven shaft rearwardly directed from said drive shaft and operatively connected with said drive shaft, a cutter fixed on said driven shaft, a horizontal forwardly extending guide parallel with said driven shaft, and a stationary blade on said guide cooperating with said cutter.

3. A lawn edger including a traction wheel, a drive shaft rotated thereby, a frame on said shaft, a rearwardly extending driven shaft perpendicular to and operatively connected with said drive shaft, a cutter mounted on said driven shaft, a horizontal forwardly extending guide beneath said driven shaft, and a stationary blade on said guide cooperating with said cutter.

4. A lawn edger including a drive shaft, a frame thereon, means to rotate said shaft, a rotatable driven shaft extending rearwardly at approximately right angles to said drive shaft, a cutter fixed to said driven shaft, geared connections between said shafts, a rearwardly extending guide plate below said driven shaft, and a stationary blade on said guide plate with which said cutter is adapted to engage to perform the cutting.

5. A lawn edger including a drive shaft a frame thereon, means to rotate said shaft, a driven shaft extending rearwardly at approximately right angles to said driven shaft, a cutter fixed to said driven shaft and rotatable therewith, geared connections between said shafts, a guide plate below said driven shaft, and approximately in the same vertical plane therewith, a guide roller rearwardly from said driven shaft, a flange on said roller, and a stationary blade on said guide plate, said cutter being positioned to cut by contacting said stationary blade.

6. A lawn edger including a drive shaft a frame thereon, means to rotate said shaft, a rotatable driven shaft extending rearwardly at approximately right angles to said driven shaft, a cutter fixed to said driven shaft, geared connections between said shafts, a horizontal guide plate below said driven shaft, means to adjust said guide plate in a vertical direction, and a stationary blade on said guide plate to be engaged by said cutter whereby the cutting action is obtained.

7. A lawn edger including a traction wheel, a drive shaft rotatable thereby, a frame supported on said shaft, a rearwardly and downwardly extending cutter shaft operatively connected with said drive shaft, a stationary cutter blade adapted to lie in an approximately horizontal position when said edger is operating, and a cutting element tapered rearwardly from said drive shaft including a plurality of cutting blades on said cutter shaft, positioned to cooperate with said stationary blade.

8. A traction wheel, a drive shaft operated thereby, a frame on said shaft, a cutter shaft rearwardly and downwardly inclined from said drive shaft, and having operative connection with said drive shaft for rotation thereby, a cutter including blades longitudinally extending from said cutter shaft and rotatable therewith and a horizontal stationary blade cooperating with said cutter.

9. An edge cutter comprising a frame, forward and rear wheels supporting said frame, a set of cutter blades mounted in said frame to rotate in a plane transversely of the frame, means to drive said blades, and a stationary blade against which said cutters engage to effect the cutting action along a narrow strip constituting the path of travel.

EMILE L. BLONDEAU.